United States Patent
Echazarreta (10) Patent No.: US 7,245,096 B2
(45) Date of Patent: Jul. 17, 2007

(54) METHOD AND APPARATUS FOR CONTROLLING THE SPEED OF A DC MOTOR

(75) Inventor: Jaime Echazarreta, Chula Vista, CA (US)

(73) Assignee: Comair Rotron, Inc., San Diego, CA (US)

( * ) Notice: Subject to any disclaimer, the term of this patent is extended or adjusted under 35 U.S.C. 154(b) by 51 days.

(21) Appl. No.: 11/284,419

(22) Filed: Nov. 21, 2005

(65) Prior Publication Data
US 2007/0114959 A1 May 24, 2007

(51) Int. Cl.
*H02P 1/00* (2006.01)

(52) U.S. Cl. ............... 318/268; 318/437; 318/254; 318/138; 318/599; 388/825; 388/838; 388/800

(58) Field of Classification Search ............... 318/437, 318/268, 138, 439, 599, 254, 376, 712; 388/825, 388/838
See application file for complete search history.

(56) References Cited

U.S. PATENT DOCUMENTS

| 2005/0225275 A1 | 10/2005 | Eskritt et al. .............. 318/437 |
| 2005/0248306 A1* | 11/2005 | Chen et al. .................. 318/712 |
| 2005/0253546 A1* | 11/2005 | Dornhof .................... 318/439 |

* cited by examiner

*Primary Examiner*—Karen Masih
(74) *Attorney, Agent, or Firm*—Bromberg & Sunstein LLP (57) ABSTRACT

A method and apparatus for controlling the speed of a DC electric motor receives a periodic commutation signal having a fixed duration on cycle and an off cycle. The commutation signal then is modified to form a periodic modified commutation signal having substantially the same period duration as the commutation signal. The modified commutation signal has a single on cycle per period. The method and apparatus then determine a desired speed of the motor, and vary the duration of the on cycle of the commutation signal to form the on cycle of the modified commutation signal. The on cycle of the modified commutation signal has a duration that is less than the fixed duration. By varying in this manner, the rotor rotates at substantially the desired speed.

21 Claims, 6 Drawing Sheets

METHOD AND APPARATUS FOR CONTROLLING THE SPEED OF A DC MOTOR

FIELD OF THE INVENTION

The invention generally relates to motors and, more particularly, the invention relates to electric motors.

BACKGROUND OF THE INVENTION

Electric motors typically have a stationary portion ("stator") that energizes a rotational portion ("rotor") by means of a prescribed signal. For example, DC electric motors typically generate a signal ("commutation signal") that causes the stator to produce an alternating magnetic field. This magnetic field interacts with permanent magnets in the rotor to cause the rotor to rotate in a controlled manner.

To that end, the commutation signal typically is a periodic signal having a single "on" portion (i.e., the signal is non-zero) and a single "off" portion (i.e., the signal is zero) for every period of the signal. To vary the speed of the rotor, many motors pulse width modulate the on portion of the commutation signal. For example, to reduce the speed by twenty percent from a maximum speed, a prior art motor may pulse width modulate the on portion of the commutation signal so that the average of the on portion is about twenty percent less than that of the on portion of the original commutation signal.

Commutation signals typically are pulse width modulated at frequencies that are much greater than that of the basic commutation signal. For example, the commutation signal may have a frequency of about 200 hertz, while the modulation frequency may be about 20 kilohertz. Undesirably, this can create electromagnetic interference (EMI), which is known to 1) interfere with other electronic devices, and 2) increase the temperature of power devices. To mitigate this interference, many prior art motors using such modulation techniques often have electronic filtering devices. Such additional devices, however, generally increase the cost and power consumption of the motors.

SUMMARY OF THE INVENTION

In accordance with one aspect of the invention, a method and apparatus for controlling the speed of a DC electric motor receives a periodic commutation signal having a fixed duration on cycle and an off cycle. The commutation signal then is modified to form a periodic modified commutation signal having substantially the same period duration as the commutation signal. The modified commutation signal has a single on cycle per period. The method and apparatus then determine a desired speed of the motor, and vary the duration of the on cycle of the commutation signal to form the on cycle of the modified commutation signal. The on cycle of the modified commutation signal has a duration that is less than the fixed duration. By varying in this manner, the rotor rotates at substantially the desired speed.

In some embodiments, the motor would attain a maximum speed if the duration of the on cycle of the commutation signal were not varied. This desired speed may be less than the maximum speed. The amplitude of the modified commutation signal illustratively is greater than zero. Among other things, the method and apparatus also may forward the modified commutation signal to the stator. In some embodiments, the commutation signal controls current draw by the motor.

The on cycle of the commutation signal may be about half of the total period of the commutation signal. In that case, the on cycle of the modified commutation signal may be less than about half of the total period of the modified commutation signal.

In some embodiments, the method and apparatus start the rotor to rotate from rest by energizing the stator with the commutation signal, and then determine that the rotor has attained the desired speed. After determining that the rotor is rotating at the desired speed, the method and apparatus may use the modified commutation signal to energize the motor to cause the rotor to continue rotating at substantially the desired speed. In various embodiments, the motor is substantially free of electromagnetic interference having frequencies that are at least ten times greater than the frequency of the commutation signal.

In accordance with another aspect of the invention, an apparatus for controlling the speed of a DC electric motor has 1) an input for receiving a periodic commutation signal having a fixed duration on cycle and an off cycle, and 2) a modifying module operatively coupled with the input. Among other things, the modifying module modifies the commutation signal to form a periodic modified commutation signal. The modified commutation signal has substantially the same period duration as the commutation signal and a single on cycle each period. The modifying module also varies the duration of the on cycle of the commutation signal to form the on cycle of the modified commutation signal. The on cycle of the modified commutation signal has a duration that is less than the fixed duration.

In some embodiments, the apparatus also has a tracking module for tracking the rotation of the module from startup to a desired speed. The modified commutation signal energizes the motor to cause the rotor to continue rotating at substantially the desired speed after the rotor reaches the desired speed.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

Rather than use pulse width modulated techniques, illustrative embodiments of the invention control rotor speed by producing one or more reduced duty cycle motor commutation signals. Various embodiments therefore do not require high frequency filtering circuitry for removing electromagnetic interference produced by pulse width modulation processes. Details of various embodiments are discussed below.

Figure 1:
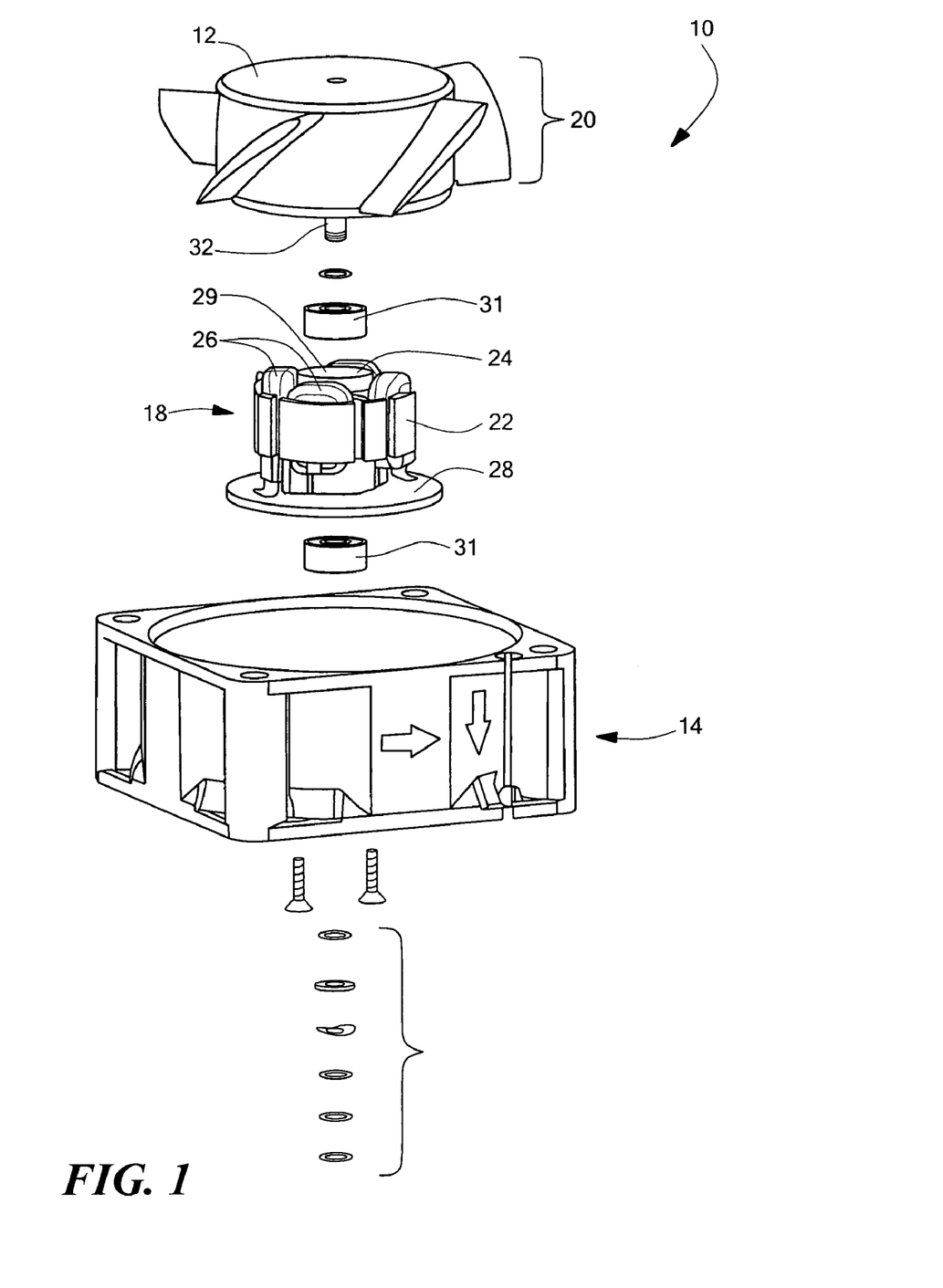
FIG. 1 schematically shows an exploded view of a DC electric motor that may be implemented in accordance with illustrative embodiments of the invention.

FIG. 1 schematically shows an exemplary brushless, four pole, DC motor 10 that may implement illustrative embodiments of the invention. In particular, the motor 10 includes a propeller 12 and thus, is a part of a cooling fan. To that end, the motor 10 includes a housing 14 with venturi (not shown), a stator portion 18 secured to the housing 14, and a rotor 20, which includes the propeller 12. It should be noted that although the motor 10 is implemented as a fan, illustrative embodiments apply to other motor applications. Accordingly, description of the motor 10 as a fan is by illustration only and not intended to limit various embodiments of the invention.

The stator 18 includes a stator core 22, a molded insulation layer 24 on the stator core 22, a coil 26 wrapped about the stator core and the insulation layer 24, and a circuit board 28 having electronics (see FIGS. 2A–5) for controlling energization of the coil 26. The insulation layer 24 includes an arbor 29 extending through a central tubular opening of the stator core 22. Bearings 31 are secured within the arbor 29 for receiving a rotor shaft (discussed below).

The rotor 20 includes a steel cup (not shown) for supporting the propeller 12, an annular permanent magnet (not shown) circumscribing the interior of the steel cup, and a shaft 32 extending from the center of the steel cup. When assembled, the shaft 32 is received by the bearings 31 secured within the arbor 29.

Figure 2A:
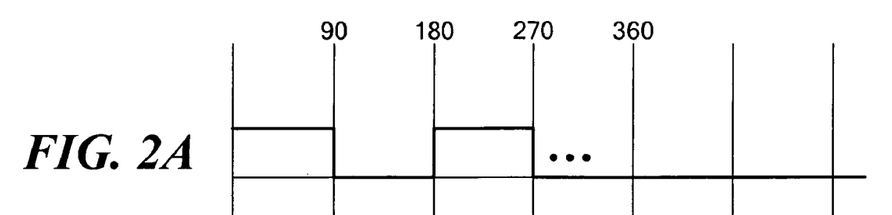
FIG. 2A schematically shows a commutation signal waveform produced by a Hall sensor monitoring rotation of a rotor.

As discussed above, the motor 10 controls its speed by producing reduced duty cycle commutation signals. More specifically, FIG. 2A schematically shows a motor commutation signal that may be produced by a Hall sensor 36 (shown in FIGS. 3 and 4) within the motor 10. As shown, for a given period (i.e., 180 degrees in this example), the commutation signal includes an "on" cycle that comprises about half of the total period, and an "off" cycle that comprises the other half of the total period. This means that the commutation signal has a duty cycle of approximately 50 percent. As known by those in the art, this commutation signal simply shows the change in polarity of the permanent magnet of the rotor 20 as it rotates. The signal is logical high from 0–90 degrees, logical low from 90–180 degrees, logical high again from 180–270 degrees, etc . . . .

In illustrative embodiments, the exemplary four pole motor 10 uses this commutation signal to produce two modified commutation signals. Specifically, the motor 10 produces a first modified commutation signal having a duty cycle of less than fifty percent (FIG. 2B), and a second modified commutation signal also having a duty cycle of less than fifty percent (FIG. 2C). The two modified commutation signals are ninety degrees out of phase. It should be noted that although the motor 10 produces these two modified commutation signals, such new signals may be considered to be modified versions of the Hall sensor generated commutation signal. In other words, it should be understood that the motor 10 is considered to modify the commutation signal of FIG. 2A simply because it generates these two modified commutation signals based upon the information in the commutation signal of FIG. 2A.

These two modified commutation signals each control separate switches within the motor 10 (discussed below) to produce the current draw shown in FIG. 2E. This is in contrast to the current draw waveform that the motor 10 may produce (see FIG. 2D) if 1) the motor 10 runs at a maximum speed 2) the duty cycle of the modified commutation signals are not reduced and 3) no pulse width modulation techniques are used. As discussed above, however, illustrative embodiments reduce the duty cycle (i.e., reduce the "on" part of the commutation signal) of each modified commutation signal to less than 50 percent of their total periods based upon the ultimate desired speed (e.g., less than the maximum motor speed).

Figure 3:
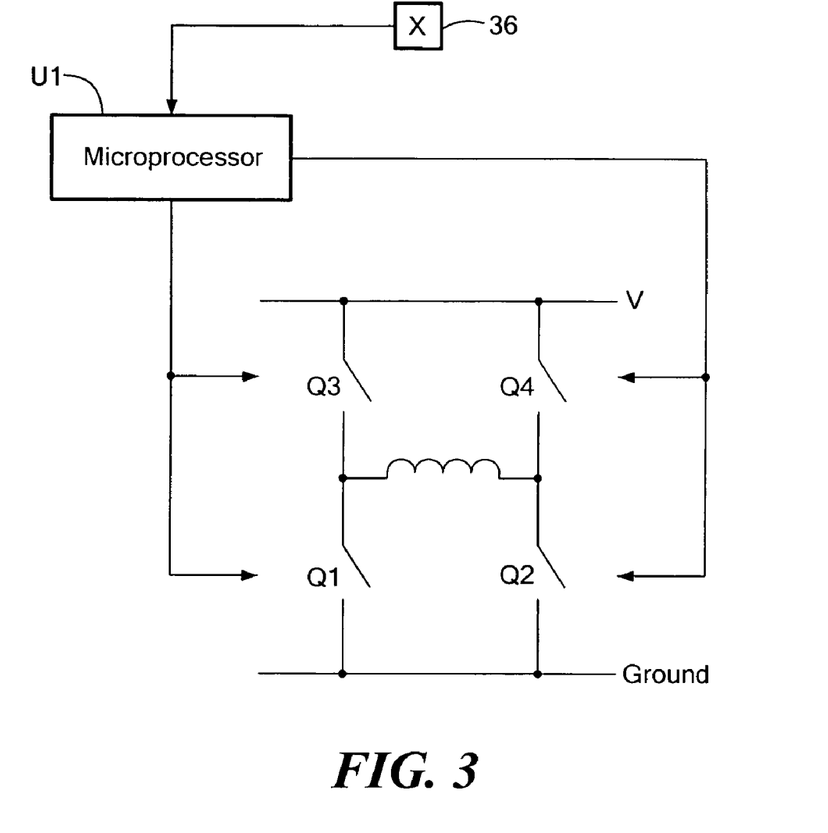
FIG. 3 schematically shows a simplified circuit that may be used to implement illustrative embodiments of the invention.

FIG. 3 schematically shows a simplified motor commutation circuit configured to produce the modified commutation signals and desired motor speed in accordance with illustrative embodiments of the invention. In particular, the circuit has four switches Q1–Q4 that control current flow across the coil 26. Of course, those skilled in the art should understand that the coil 26 may be part of one or more poles in a DC electric motor 10. For example, when implemented in the illustrative four pole DC motor 10, the coil 26 may actually comprise four coils in series that cooperate to rotate the rotor 20. The switches Q1 and Q2 are referred to as "low side switches" because they are coupled to ground, while the switches Q3 and Q4 are referred to as "high side switches" because they are coupled with the high voltage V.

A microprocessor U1, among other things, controls the switches Q1–Q4 to modify the commutation signal in a controlled manner. More specifically, the microprocessor U1 receives a rotor speed signal (i.e., FIG. 2A) from a Hall sensor 36 monitoring the rotor 20. The microprocessor U1 then generates the two modified commutation signals (see FIGS. 2B and 2C) to selectively open and close the two low side switches Q1 and Q2. For example, the microprocessor U1 may forward the modified commutation signal of FIG. 2B to low side switch Q1, while forwarding the modified commutation signal of FIG. 2C to the low side switch Q2. As a result, the relevant low side switches Q1 or Q2 are off for a longer period of time, thus not completing a circuit with the appropriate high side switch Q3 or Q4. The current draw period therefore is shorter (i.e., see FIG. 2E) because the coil 26 is energized for a shorter time. Consequently, less power is generated and the spike portion of the waveform shown in FIG. 2D is avoided.

Figure 2B:
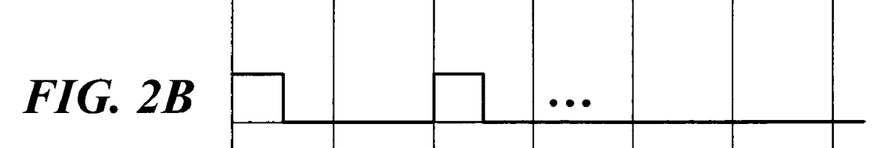
FIG. 2B schematically shows a first modified commutation signal waveform produced in accordance with illustrative embodiments of the invention.
Figure 2C:
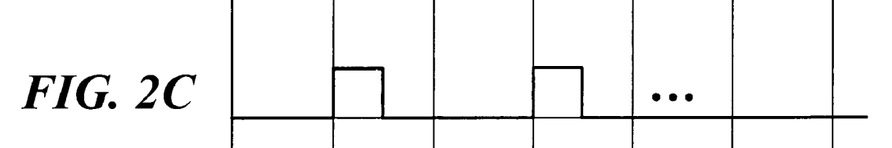
FIG. 2C schematically shows a second modified commutation signal waveform produced in accordance with illustrative embodiments of the invention.
Figure 2D:
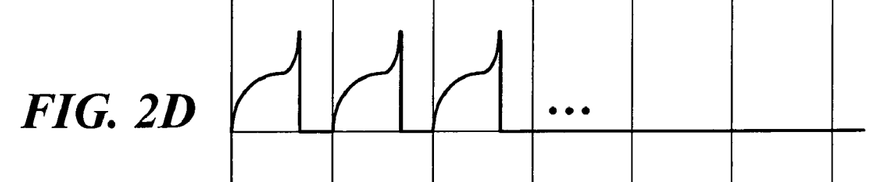
FIG. 2D schematically shows current draw produced by a specific prior art motor.
Figure 2E:
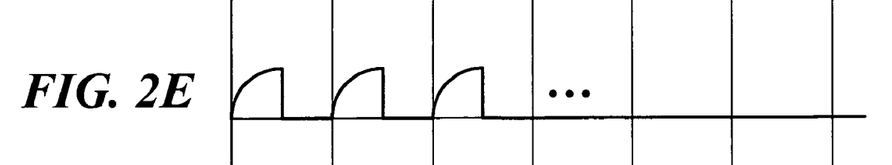
FIG. 2E schematically shows current draw produced by a motor implementing illustrative embodiments of the invention.

The waveforms in FIGS. 2B and 2C show the microprocessor U1 shortening the duty cycle of the modified commutation signal at the latter stage of their respective on cycles. By doing this, the current spike shown during the latter stage of the on cycle is eliminated. In alternative embodiments, however, the microprocessor U1 may shorten the duty cycle at the beginning stage of the on cycle. Among other things, one skilled in the art can ascertain an appropriate part of the duty cycle to shorten based upon the characteristics of the motor 10, its circuitry, and application. Eliminating the current spike shown in the exemplary waveform of FIG. 2D therefore shows one such consideration that may be taken into account when determining the appropriate part of the commutation signal to remove.

Figure 4:
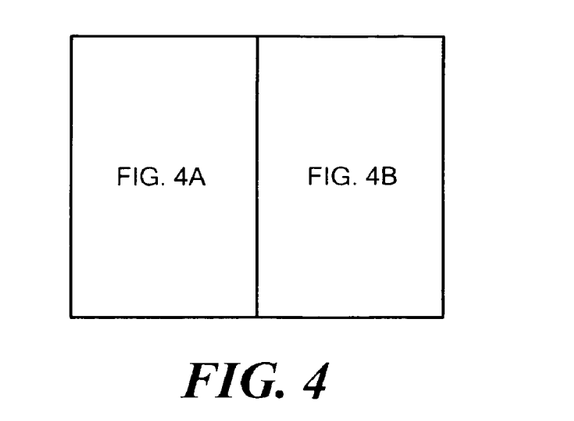
FIG. 4 schematically shows additional details of a circuit that may be used to implement illustrative embodiments of the invention.
Figure 4A:
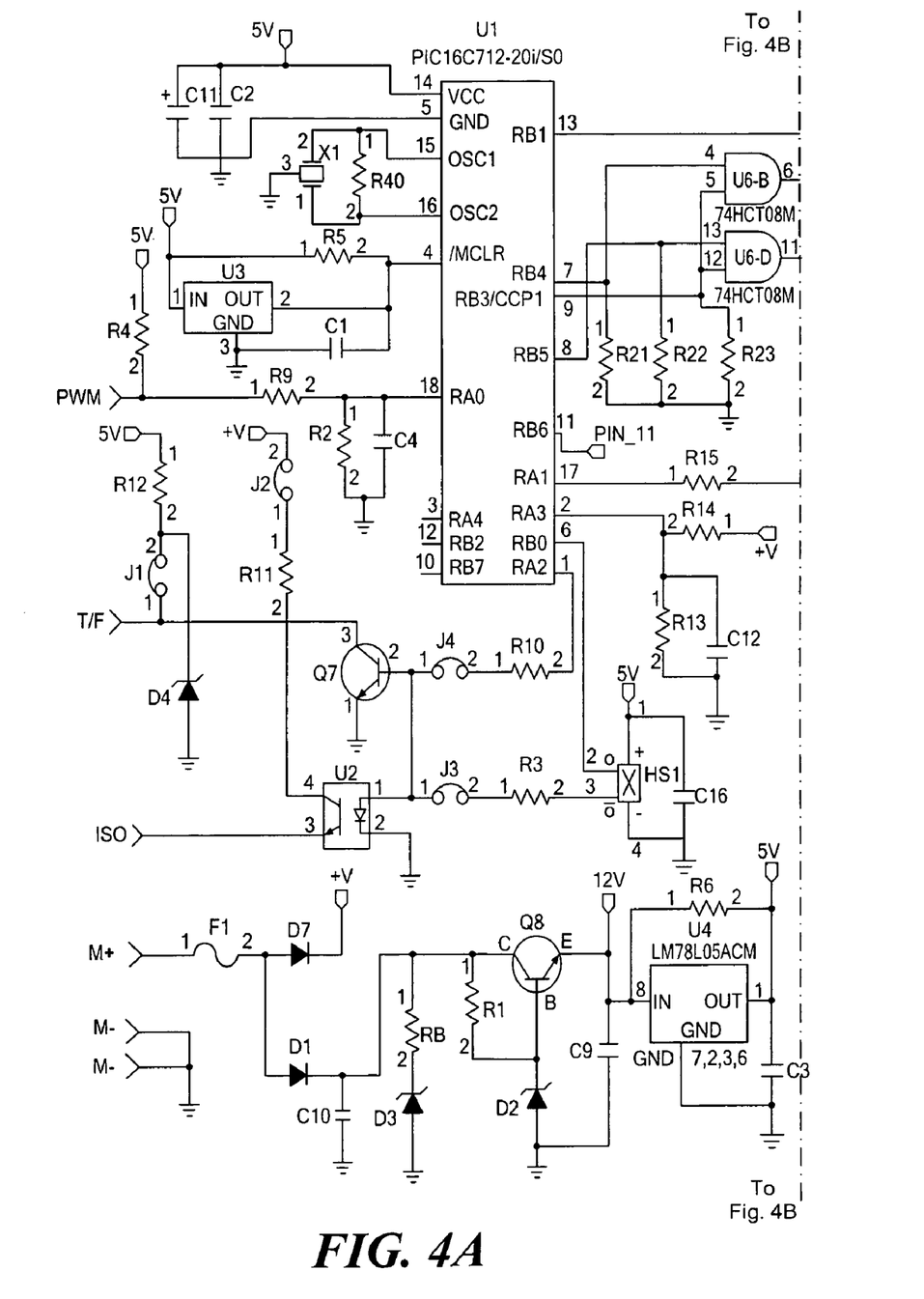
Figure 4B:
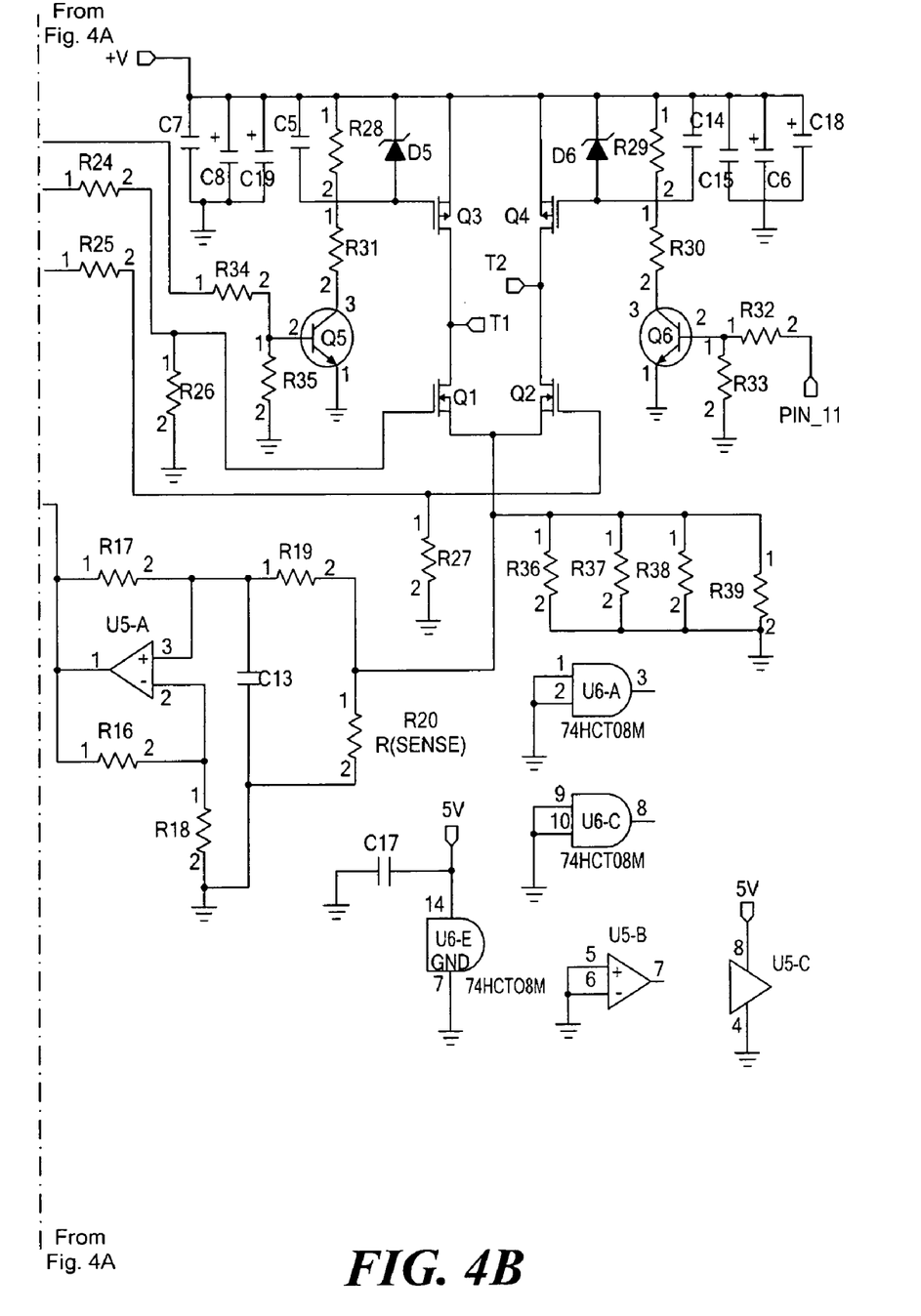

FIG. 4 shows more details of an illustrative circuit that may be used in various embodiments of the invention. It should be noted that the specific configuration in this diagram is illustrative and not intended to limit all embodiments. Instead, it shows one of a wide variety of circuit configurations that may produce the desired results.

One of ordinary skill in the art should be able to understand various parts of the circuit. For example, the circuit includes the microprocessor U1, which may be a PIC processor, such as model number PIC16C712-20i/SO microprocessor, distributed by Microchip Technology Inc. of Chandler, Ariz. The microprocessor U1 has an input RB0 that receives a rotor speed signal from the Hall sensor 36, and three outputs RB4, RB3/CCP1, and RB5 that deliver switch control signals to a pair of AND gates. The AND gates responsively each connect to the gate of one of the low side switches Q1 and Q2, thus controlling current flow through the coil 26.

The microprocessor U1 also has another output RB1 that indirectly couples with the high side switch Q3, and another output RB6 that similarly indirectly couples with the high side switch Q4. Various transistors, capacitors, diodes, resistors, and other components cooperate to produce the desired switching results. Although the switches Q1 and Q4 are MOSFETS, they may be other types of switches known in the art.

The circuit has a number of additional portions, such as 1) a tachometer output ISO coupled with an opto-isolator U2 that receives the rotor speed signal from the Hall sensor 36, 2) voltage regulation circuitry, and 3) other signal conditioning circuitry. It nevertheless should be reiterated that details of this circuit are exemplary only and not intended to limit the scope of various embodiments. Accordingly, those skilled in the art could use different circuitry with different functionality to produce comparable results to those discussed above and below.

Figure 5:
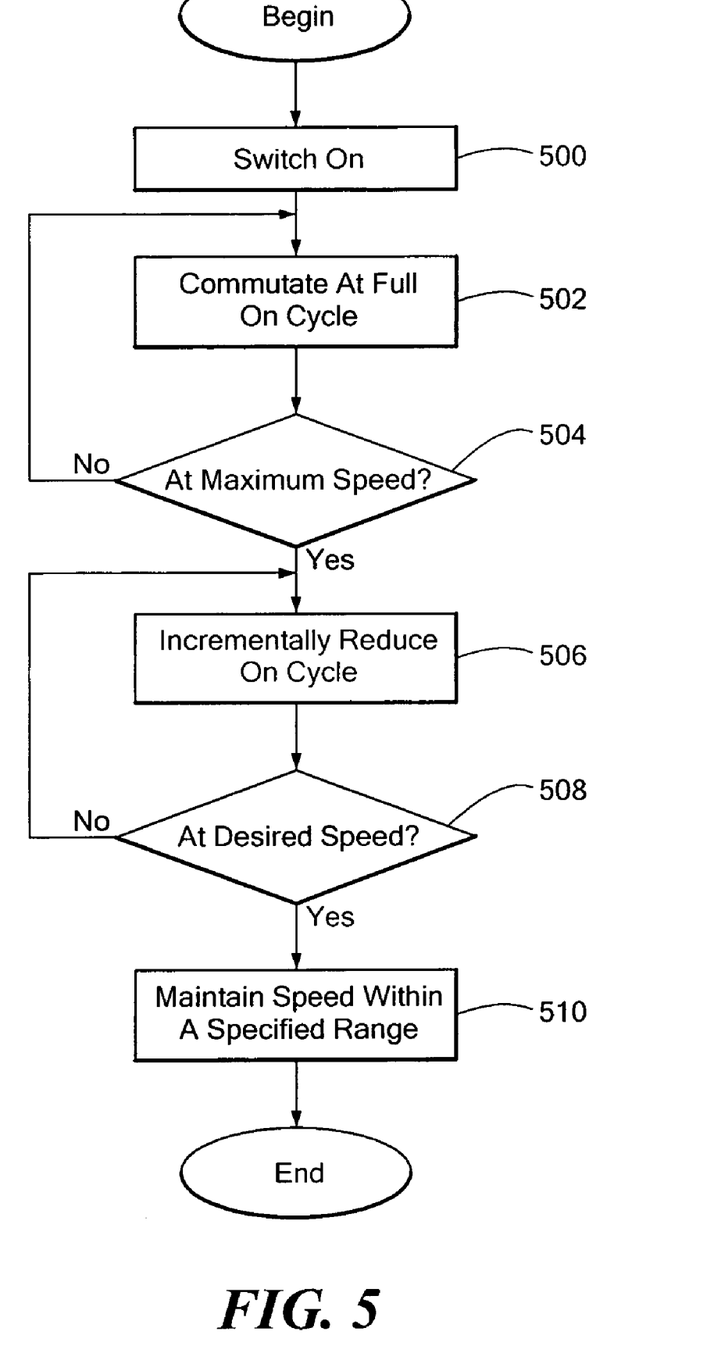
FIG. 5 shows a process of controlling motor speed in accordance with illustrative embodiments of the invention.

FIG. 5 shows an illustrative process for causing the motor 10 to rotate at a desired speed. The process begins at step 500, in which the motor 10 is turned on. For example, a user may move a switch to an on position, thus energizing the circuitry.

The process then continues to step 502, which commutates the motor 10 at a full on cycle (or, alternatively, as a component of so called soft-start to minimize the inrush of current at startup). The microprocessor U1 thus produces two separate out of phase commutation signals that each have a fifty percent duty cycle. As noted above, each commutation signal is forwarded to one of the low side switches Q1 or Q2. Accordingly, at this point in the process, the motor 10 has maximum torque to rotate toward its maximum rotational speed.

It then is determined at step 504 if the motor 10 is rotating at maximum speed. For example, the microprocessor U1 could determine if the rotor 20 is rotating at a prespecified maximum RPM. Such a maximum speed may have been experimentally determined and stored in memory. Accordingly, to execute step 504, the microprocessor U1 simply compares the actual rotor speed with the stored value in memory to determine if the rotor 20 is at its maximum speed. Alternatively, the microprocessor U1 may determine that the rotor 20 has reached its maximum speed by simply determining that the acceleration of the rotor 20 is substantially zero.

If it is determined at 504 that the rotor 20 is not rotating at the maximum speed, then the microprocessor U1 continues to forward the two commutation signals at a full on cycle. Conversely, if the rotor 20 is rotating at the maximum speed at this time, then the process continues to step 506, which incrementally reduces the duration of the on cycle of the two commutation signals (i.e., the modified commutation signals) produced by the microprocessor U1. To that end, in illustrative embodiments, the microprocessor U1 may gradually reduce the duty cycle of the modified commutation signals in fixed percentages of the total duty cycle. For example, at step 506, the microprocessor U1 may reduce the duty cycle by one percent of the total period. Consequently, the two low side switches Q1 and Q2 are on for shorter durations during each period.

After reducing the duty cycle, the microprocessor U1 determines if the rotor 20 is rotating at the desired speed (step 508). This desired speed could be a preprogrammed speed, or actively modified by means of some input interface, such as a user controllable exterior switch, or a user interface. If the rotor 20 is not rotating at the desired speed, then the process loops back to step 506, which again incrementally reduces the durations of the on cycles.

If, however, the rotor 20 is rotating at the desired speed at step 508, then the process continues to step 510, which maintains the speed within a specified range. For example, if the maximum speed is 2000 RPMs and the desired speed is 1600 RPMs, then the microprocessor U1 may control the speed to be between 1580 RPMs and 1620 RPMs. To that end, after the rotor 20 is rotating at the high end of the range (e.g., 1620 RPMs), it may reduce the noted duty cycles further and permit the inertia of the rotor 20 to continue to rotate the rotor 20 at that speed range. Of course, the amount of time that it continues to rotate depends upon a number of things, including the mass of the rotor 20 and the rotational resistance it experiences. When the microprocessor U1 detects that the rotor 20 is rotating at the low end of the range (e.g., 1580 RPMs), it may increase the respective duty cycles until the rotor 20 again is rotating at the high end of the range. The rotor speed therefore illustratively oscillates about its optimal speed in this manner during operation.

Of course, the size of the rotational range depends upon the application. In some embodiments, for example, the range is substantially negligible—the microprocessor U1 attempts to maintain the rotor 20 at its desired speed. Any oscillation as described above therefore is not intended in such embodiments.

At any time in the process, the desired speed can change. For example, a user may change the desired speed by manually manipulating a controller (not shown) on the motor 10. This controller may be a switch that permits various speed settings, such as "low," "medium," and "high." The microprocessor U1 should detect these changes and attempt to substantially immediately accommodate them. As another example, the microprocessor U1 may be programmed to change the speed in response to some stimulus, such as a temperature reading, or every set time period, such as every several hours.

In alternative embodiments, rather than first rotating the rotor 20 at the maximum motor speed before reducing the duty cycles as shown in FIG. 5, the microprocessor U1 may begin reducing the duty cycles as soon as the rotor 20 rotates at the desired speed. In other words, such embodiment commutate from rest to the desired speed using the signal commutation signal of FIG. 2A. After the rotor 20 attains the desired speed, the microprocessor U1 reduces the duty cycles in the manner discussed. Accordingly, unless the desired speed is the maximum speed (or very close to it), the motor 10 does not force such a high speed.

It should be noted that principles of various embodiments apply to other types of motors. For example, the microprocessor U1 may produce only a single modified commutation signal, or more than two modified commutation signals, depending upon the number of poles or other configurations in the motor 10. In yet other embodiments, the duty cycle of only one of the commutation signals forwarded to the low side switches Q1 and Q2 is modified. Accordingly, discussion of specific pole numbers, phases, duty cycle reductions, is exemplary and not intended to limit all embodiments. Such discussion is meant to illustrate various embodiments.

Rather than using high frequency pulse width modulation techniques, various embodiments thus reduce the duty cycle of the commutation signal to effectively control the speed of the rotor 20. No high frequency filtering devises therefore are required to remove electromagnetic interference produced by such modulation techniques. Illustrative embodiments therefore should substantially mitigate high driver temperatures and power loss associated with high frequency pulse with modulation techniques.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the flow chart described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of controlling the speed of a DC electric motor, the motor having a rotor and a stator, the method comprising:
   receiving a periodic commutation signal having an on cycle and an off cycle, the on cycle having a fixed duration;
   forming a periodic modified commutation signal having substantially the same period duration as the commutation signal, the modified commutation signal having a single on cycle per period;
   determining a desired speed of the motor; and
   varying the duration of the on cycle of the commutation signal to form the on cycle of the modified commutation signal, the on cycle of the modified commutation signal having a duration that is less than the fixed duration, varying causing the rotor to rotate at substantially the desired speed.

2. The method as defined by claim 1 wherein the motor has a maximum speed if the duration of the on cycle of the commutation signal were not varied, the desired speed being less than the maximum speed.

3. The method as defined by claim 1 further comprising forming a plurality of modified commutation signals each having substantially the same period duration as the commutation signal, each of the modified plurality of modified commutation signals having a single on cycle per period, the on cycle of the each modified commutation signal having a duration that is less than the fixed duration, the modified commutation signal being one of the plurality of modified commutation signals.

4. The method as defined by claim 1 further comprising forwarding the modified commutation signal to the stator.

5. The method as defined by claim 1 wherein the commutation signal controls current draw by the motor.

6. The method as defined by claim 1 wherein the on cycle of the commutation signal is about half of the total period of the commutation signal, the on cycle of the modified commutation signal being less than about half of the total period of the modified commutation signal.

7. The method as defined by claim 1 further comprising:
   starting the rotor to rotate from rest by energizing the stator with the commutation signal;
   determining that the rotor has attained the desired speed; and
   after determining that the rotor is rotating at the desired speed, using the modified commutation signal to energize the motor to cause the rotor to continue rotating at substantially the desired speed.

8. The method as defined by claim 1 wherein the motor is substantially free of electromagnetic interference having frequencies that are at least ten times greater than the frequency of the commutation signal.

9. An apparatus for controlling the speed of a DC electric motor, the motor having a rotor and a stator, the apparatus comprising:
   an input for receiving a periodic commutation signal having an on cycle and an off cycle, the on cycle having a fixed duration; and
   a modifying module operatively coupled with the input, the modifying module modifying the commutation signal to form a periodic modified commutation signal, the modified commutation signal having substantially the same period duration as the commutation signal and a single on cycle each period, the modifying module varying the duration of the on cycle of the commutation signal to form the on cycle of the modified commutation signal, the on cycle of the modified commutation signal having a duration that is less than the fixed duration.

10. The apparatus as defined by claim 9 wherein the amplitude of the modified commutation signal is greater than zero.

11. The apparatus as defined by claim 9 further comprising an output for forwarding the modified commutation signal to the stator.

12. The apparatus as defined by claim 9 wherein the on cycle of the commutation signal is about half of the total period of the commutation signal, the on cycle of the modified commutation signal being less than about half of the total period of the modified commutation signal.

13. The apparatus as defined by claim 9 further comprising:
   a tracking module for tracking the rotation of the module from startup to a desired speed, the modified commutation signal energizing the motor to cause the rotor to continue rotating at substantially the desired speed after the rotor reaches the desired speed.

14. The apparatus as defined by claim 9 wherein the motor is substantially free of electromagnetic interference having frequencies that are at least five times greater than the frequency of the commutation signal.

15. A computer program product for use on a computer system for controlling the speed of a DC electric motor, the motor having a rotor and a stator, the computer program product comprising a computer usable medium having computer readable program code thereon, the computer readable program code comprising:
   program code for receiving a periodic commutation signal having an on cycle and an off cycle, the on cycle having a fixed duration;
   program code for forming a periodic modified commutation signal having substantially the same period duration as the commutation signal, the modified commutation signal having a single on cycle per period;
   program code for determining a desired speed of the motor; and
   program code for varying the duration of the on cycle of the commutation signal to form the on cycle of the modified commutation signal, the on cycle of the modified commutation signal having a duration that is less than the fixed duration, varying causing the rotor to rotate at substantially the desired speed.

16. The computer program product as defined by claim 15 wherein the motor has a maximum speed if the duration of the on cycle of the commutation signal is not varied, the desired speed being less than the maximum speed.

17. The computer program product as defined by claim 15 wherein the amplitude of the modified commutation signal is greater than zero.

18. The computer program product as defined by claim 15 further comprising program code for forwarding the modified commutation signal to the stator.

19. The computer program product as defined by claim 15 wherein the on cycle of the commutation signal is about half of the total period of the commutation signal, the on cycle of the modified commutation signal being less than about half of the total period of the modified commutation signal.

20. The computer program product as defined by claim 15 further comprising:
   program code for starting the rotor to rotate from rest by energizing the stator with the commutation signal;
   program code for determining that the rotor is rotating at the desired speed; and
   program code for using the modified commutation signal to energize the motor to cause the rotor to continue rotating at substantially the desired speed after determining that the rotor is rotating at the desired speed.

21. The computer program product as defined by claim 15 wherein the motor is substantially free of electromagnetic interference having frequencies that are at least five times greater than the frequency of the commutation signal.

* * * * *